United States Patent Office 3,392,651
Patented July 16, 1968

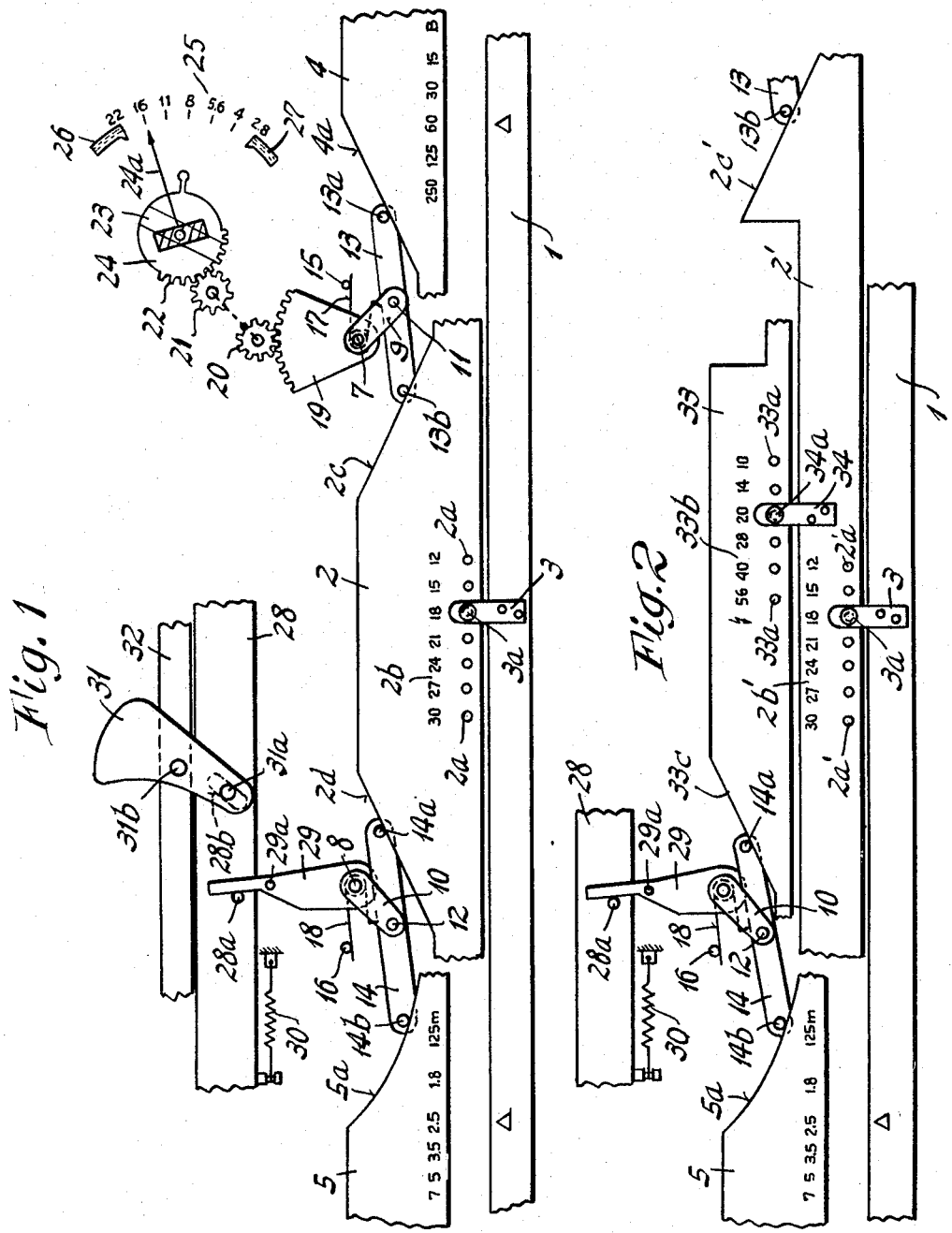

3,392,651
PHOTOGRAPHIC CAMERA WITH
EXPOSURE METER
Erwin Weller, Calmbach, Black Forest, Germany, assignor to Prontor-Werk Alfred Gauthier, G.m.b.H., Calmbach, Black Forest, Germany, a corporation of Germany
Filed Oct. 8, 1965, Ser. No. 493,969
Claims priority, application Germany, Oct. 17, 1964, G 41,805
9 Claims. (Cl. 95—64)

This invention relates to a photographic camera having a built-in or attached exposure meter, and whose diaphragm can be automatically set for different apertures in accordance with film sensitivity, exposure time, and distance.

Heretofore cameras have been known to provide automatic setting of the diaphragm in accordance with film sensitivity for use in the daylight range, and in accordance with the guide number of the flash gun for use in the flash range. In these cameras the member employed for inserting the guide number is superimposed upon the distance setting member. However, a variety of possibilities exists for coupling the member that takes into account the film sensitivity, to the member adapted to set the exposure time.

When carrying out flash exposures, it is essential to take into account the film sensitivity. Heretofore, however, the construction of the member by which the film sensitivity was inserted into the camera, was such that it was coupled only to the exposure meter. Automatic setting of the diaphragm was not included in the flash range. Two separate and independent settings were required for these purposes. Consequently, whenever a film of different sensitivity than the one preceding it was inserted into the camera, it was necessary to adjust not only the member corresponding to film sensitivity, but it was also required to set a separate member in accordance with guide number of the new film. This particular setting procedure had to be carried out even though the same flash gun was continually being used. Extreme care had to be exercised in performing these separate settings in order to obtain satisfactory results.

The present invention eliminates the requirement for such separate settings by providing that several functions may be derived from the member which is set in accordance with the film sensitivity. These functions are, in turn, employed for setting the diaphragm for the various operating ranges of the camera. The invention accomplishes this novel setting procedure by coupling the member set in accordance with film sensitivity, to the exposure meter through the intermediate means of a control edge and a summation mechanism. This particular coupling takes into account expose time, or shutter speed. The distance factor is taken into account by also coupling the film sensitivity member to the diaphragm actuating ring through the use of another control edge and summation unit. The net result of this arrangement is that the film sensitivity setting member serves to set the diaphragm automatically both in the daylight and flashlight range of the camera. By making it possible, in this manner, to set the diaphragm by means of the film sensitivity member when operating in the flash range of the camera, the handling of the camera becomes simplified. Moreover, the possibilities of incorrect settings or omissions of settings are reduced.

It is therefore an object of this invention to provide a mechanism by which the film sensitivity setting member serves to set automatically the diaphragm in the daylight range as well as in the flashlight range of the camera.

It is another object of the present invention to provide summation units in the form of lever differentials within the mechanism employed to set the diaphragm for the daylight and flashlight ranges of the camera. Such summation units allow flexibility for the construction of the camera and/or shutter. The lever differentials are of flat space-saving construction, and can be readily adapted to prevailing space conditions.

A still further object of this invention is to provide a mechanism by which a member set with the guide number or index is coupled to the film sensitivity setting member. The application of the index setting member in this manner, further simplifies the handling of the camera. Thus when a film of different sensivity than the one before it, is inserted into the camera, it is only necessary to adjust the film sensitivity setting member to the new value. The index setting member remains unchanged when the same flash gun is used. In order to accomplish this object, the index setting member is provided with a scale to accommodate the different intensities of the flash guns. The index setting member is further provided with a control edge and coupled to the film sensitivity setting member. The index setting member is also connected to the distance setting member by means of a lever differential acting on the diaphragm.

Other objects and advantages are set forth in greater detail in the following specification taken in conjunction with the accompanying drawings in which:

FIGURE 1 shows the correlation of the individual setting members adapted for the insertion of exposure, film sensitivity, and distance, when the same type of flashbulb is constantly used.

FIGURE 2 shows an arrangement which allows the use of different types of flashbulbs, and retains the organization of the individual setting members as shown in FIGURE 1 for insertion of exposure, film sensitivity and distance.

In accordance with FIGURES 1 and 2, the front plate 1 of an intra-lens shutter as it is commonly referred to, is firmly connected to the housing of the shutter. A setting member 2 designed to take into account the factor film sensitivity, may be firmly connected to the front plate 1 in different relative positions. For this purpose, a plurality of capturing notches 2a may be provided on the film sensitivity setting member 2, and an elastic spring blade 3 may be fixed to the front plate 1. The spring blade carries at its free end a coupling pin 3a. According to the scale 2b indicated in FIGURE 1, a specific value for film sensitivity may be associated with each of the notches. The film sensitivity setting member 2 includes two control edges 2c and 2d as shown in th arangemnt of FIGURE 1. In order to allow for exposure time and distance, two additional setting members 4 and 5 are respectively associated with the film sensitivity setting member 2. Each one of the two setting members 4 and 5, arranged so that they may be positioned in relation to the film sensitivity setting member 2, is provided with a control edge 4a and 5a respectively.

In order to allow automatic diaphragm settings for both daylight and flash exposures, two summation units in the form of lever differentials are associated with the film sensitivity setting member 2. One of these lever differentials is, in addition, associated with the exposure time setting member 4, while the other differential is similarly associated with the distance setting member 5. Each one of the two summation units comprises essentially a rotatable shaft 7 and 8 to which lever arms 9 and 10 are connected respectively. At the free ends of the lever arms 9 and 10 are connected by means of pivots 11 and 12, the differential levers 13 and 14. These differential levers are provided with pins 13a and 13b, and 14a and 14b at each end respectively. Due to the influence of the coil springs 17 and 18 acting between the lever arms 9 and 10 and the fixed pins 15 and 16, the pins of the differential levers 13 and 14 engage the corresponding control edges.

The lever differential consisting of components 7, 9, 11, and 13, is adapted to influence the measuring mechanism of an exposure meter built into the camera. For this purpose, a gear segment 19 is non-rotatably mounted on the shaft 7, and is mechanically connected to a gear segment 22 through a gear drive represented by pinions 20 and 21 interconnected by the shaft or transmission line shown by a dashed line. The gear segment 22 may, in turn, be fixed to the base frame 23 of a measuring device 24. For the purpose of inserting exposure time and film sensitivity, the position of the base frame 23 is made variable. This is the case of the majority of cameras having fully automatic or semi-automatic diaphragm setting features. This is because a diaphragm setting corresponding to a specific light condition can be obtained in such cameras only when exposure time and film sensitivity have been first taken into account on the measuring device 24.

The rotating coil of the measuring mechanism 24 carries an indicator 24a which points to a scale 25 provided with diaphragm values. A warning area 26 and 27 may follow the extreme values "22" and "2.8" respectively. As soon as the indicator 24a enters a warning area, it is implied that prevailing light conditions no longer permit useful photographs to be taken because of underexposure or overexposure. The arrangement of the diaphragm scale 25 and of the two warning areas 26 and 27 may be such, that the test reading becomes visible in a window of the housing of the camera, or is mirrored into the view finder by means of prisms.

For automatic setting of the diaphragm in the flash range, the lever differential consisting of components 8, 10, 12, and 14, may be mechanically connected to a diaphragm actuating ring 28. For this purpose, a lever 29 is non-rotatably mounted on the shaft 8. The free end of this lever 29 is forced against driving pin 28a due to spring 18 and a spring 30 acting on the ring 28. Positioned on the ring 28 are a number of diaphragm lamellae 31, only one of which is shown in the drawing for the sake of simplicity. An additional bearing location for the lamellae 31 may be provided on a second ring 32. The two rings 28 and 32 may be relatively movable as well as fixable. The lamellae 31 are best positioned on the diaphragm actuating ring 28 by means of a pin and slot connection 31a and 28b respectively, as well as by pin 31b on the ring 32. The combination of pin 31a and slot 28b thus allows both rotary and translational motion.

In order to permit the taking of daylight photographs with automatic diaphragm settings, a sensing device may be provided which is not shown in the drawing. This device may be mechanically connected to the diaphragm actuating ring 32 and may comprise a member which senses the light-responsive setting of indicator 24a, after film sensitivity and exposure time have been preset, and causes therefrom the proper and automatic setting of a diaphragm aperture.

The arrangement of FIGURE 1 may also be associated with a switching device which makes it possible to influence the individual setting members in such a manner, that the diaphragm can be set automatically in the daylight range, as well as in the flash range. This may be accomplished by responding to the position of indicator 24a for the situation involving the daylight range. In the case of the flash range, the response would be with respect to the lever differential 8 associated with the film sensitivity setting member 2 as well as with the distance setting member 5.

The setting serving to switch from daylight to flash range may best be made to cooperate with a pin 29a fixed on the lever 29, in such a manner that when the "automatic flash" position is set, lever 29 as well as differential lever 14 occupy the positions shown in FIGURE 1. On the other hand, when switching to "automatic daylight" position, an actuating member (not shown in the drawing) comes into engagement with pin 29a and pivots lever 29 against the force of spring 18, whereby the differential lever 14 is lifted off the control cam 5.

The arrangement of FIGURE 1 may be operated in the following manner:

To set the aforementioned photographic camera, the value corresponding to the film used with the camera must first be applied to the film sensitivity setting member 2. This is accomplished by engaging the coupling pin 3a with the proper notch 2a. If flash exposures are to be obtained with the camera, the photographer has to convey the switching device (not shown) of the camera to the setting position provided for this purpose. During this process, the switching device will lock into position the diaphragm actuating ring 32, while the ring 28 is allowed to be freely movable. At the same time, the actuating member of the switching device engaged with pin 29a, is moved so as to convey the differential lever 14 as well as the lever 29 into the positions illustrated in FIGURE 1. This is made possible through the action of the coil spring 18. In order to obtain a setting of the diaphragm that corresponds properly to the guide number in the flash range, the photographer now merely has to adjust the setting member designed to take the distance into account. During this procedure, the pin 14b of the lever 14 slides along the cam 5a, and pin 14a acts as a momentary pivot. The resulting rotary motion is transmitted to the shaft 8 by means of the lever 10, and is subsequently transmitted to the diaphragm actuating ring 28 via the lever 29. Due to the rotation of the ring 28, the diaphragm lamellae 31 are pivoted about the pins 31b and release a diaphragm aperture which corresponds to the proper guide number and to the distance which has been set. When carrying out flash exposures, therefore, the photographer has to merely observe that the type of flashbulb being used coincides with the type of flashbulb specified for the camera.

In the flash range of the camera, the lever differential 7 exerts no influence whatsoever on the diaphragm setting. This is possible because rotary motions of the setting members 2 and 4 merely change the basic position of the measuring device 24. Thus, since the diaphragm actuating ring 32 is locked in place in the flash range of the camera, and since there is merely a unilaterally acting, i.e., tensional connection between the sensing device coupled to ring 32 and the measuring device 24, it is possible to move the setting members 2 and 4, without thereby exerting any influence on the diaphragm actuating ring. The photographer is, therefore, in no way restricted with respect to the selection of the exposure time when operating in the flash range.

If the photographer wishes to carry out daylight exposures with automatic diaphragm settings, he will first have to move the switching device of the camera to the setting provided for this purpose. During this operation, the ring 28 becomes locked into position, while the diaphragm actuating ring 32 becomes now freely movable. During the switching procedure, the actuating member of the switching device engages the pin 29a, and thereby causes a clockwise rotation of the lever 29. The resulting effect is that the differential lever 14 is lifted off the control edge 5a. The setting members 2 and 5 can now be moved within their entire ranges, without causing lever 29 to contact the driving pin 28a.

If it is desired to change over from flash exposures to daylight exposures using the same film, the setting of member 2 need not be changed. The desired exposure time can be preselected by means of the setting member 4. During this operation, the gear segment 19 is moved by the lever differential 7 and its connecting links. The gear segment 19, in turn, positions base frame 23 in accordance with film sensitivity and exposure time, by means of the gearing 20 and 21. By means of the sensing device (not shown in the drawing), the diaphragm actuating ring 32 is moved out of its starting position by the amount corresponding to the setting of the indicator 24a. This causes diaphragm lamellae 31 to move to the aperture setting which corresponds to the prevailing light conditions.

With the arrangement shown in FIGURE 1, it is possible to carry out flash exposures with the same type of flashbulb only. The design shown in FIGURE 2, on the other hand, allows the option to use flash guns of different intensity. A setting member 33 adapted to take into account different index numbers, is associated for this purpose with the film sensitivity setting member 2'. Member 33 can be coupled in different setting positions to the member 2'. The setting member 2' comprises a spring blade 34 provided with a coupling pin 34a. The index setting member 33 comprises a plurality of locking notches 33a. According to the arrangement shown in FIGURE 2, a specific index value of the scale 33b is associated with each notch 33a. In a manner similar to that shown in the configuration of FIGURE 1, the film sensitivity setting member 2' includes a control edge 2c'. This control edge engages the pin 13b of the lever differential 7. The control edge 33c cooperates with the lever differential 8. The feature of allowing the relative position of the index setting member 33 to be changed with respect to the film sensitivity setting member 2', permits the use of flashbulbs with different light intensity. This is due to the fact that the diaphragm setting ring 28 is influenced in the flash range of the camera, not only by the position of film sensitivity setting member 2', but additionally by the relative position of index setting member 33.

The expression "index" generally refers to the guide number for a specific film sensitivity. The index thus represents a single, invariable value for the intensity of the flash source. Instead of using the index, a flashbulb type scale may be provided containing, for example, the reference values PF1, PF5, XM1, XM5, etc.

When carrying out flash exposures, it is necessary to set member 33 with the value corresponding to the index of the flash gun being used. This setting is in addition to those described for the arrangement of FIGURE 1. The film sensitivity and the index of the flash gun are thereby inserted into the shutter. The setting of member 5 with the correct distance value, causes the diaphragm actuating ring 28 to become rotated by means of lever differential 8 and by means of the lever 29. This results in the automatic setting of the diaphragm aperture according to the correct guide number. The procedure of operating the arrangement of FIGURE 2 in the daylight range, is identical to that of FIGURE 1.

It is to be understood that the use of the mechanisms shown in FIGURES 1 and 2 is not limited to cameras with automatic diaphragm setting features in the daylight range. These arrangements can also be used in those cases in which exposure is based on the resetting principle. In those situations the diaphragm actuating ring is reset to a diaphragm aperture value which corresponds to the proper lighting.

While this invention has been described in some detail, it will be understood by those skilled in the art that variations and modifications may be made without departing from the spirit thereof or the scope of the following claims.

What is claimed is:

1. A photographic camera with built-in or attached exposure meter comprising a diaphragm capable of being automatically set for different apertures, said apertures depending upon film sensitivity, exposure time and distance: setting members for inserting into the camera values of film sensitivity, exposure time and distance: a first summation mechanism coupled to said film sensitivity setting member and to said exposure time setting member: a second summation mechanism coupled to said distance setting member and to said film sensitivity setting member: a diaphragm actuating ring: linkage connecting said first summation mechanism to the base frame of said exposure meter: and linkage connecting said second summation mechanisms to said diaphragm actuating ring for automatic setting of said aperture.

2. The photographic camera of claim 1 wherein said summation mechanisms comprise lever differentials having input and output members.

3. The photographic camera of claim 2 wherein said setting members for film sensitivity, exposure time and ditsance contain control edges which bear against said input members of said lever differentials, and said diaphragm actuating ring is coupled to the output member of said lever differential associated with the distance and film sensitivity setting members.

4. The photographic camera of claim 3 wherein a link bears against a pin fastened to said diaphragm actauting ring, and connects to the output member of said lever members, said link being retained in position and forced to bear against said pin by means of springs acting upon the link and said diaphragm actuating ring.

5. The photographic camera of claim 3 wherein said control edges are non-linear.

6. The photographic camera of claim 1 wherein scales are associated with said setting members to provide means for inserting into the camera proper values for film sensitivity, exposure and distance.

7. The photographic camera of claim 6 wherein notches are associated with each marking of the scale corresponding to the film sensitvity setting member, a pin attached to a spring blade is fastened to the housing of said camera.

8. The photographic camera of claim 1 wherein a member capable of being set with different flash index numbers, is coupled to said film sensitivity setting member, said member associated with settings of flash index numbers having a control edge connected to said distance setting member by means of the summing mechanism associated with said distance setting member.

9. The photographic camera of claim 8 wherein a scale indicating flash index numbers is associated with said setting member for flash index numbers, notches are associated with each marking of said scale, a pin attached to a spring blade engages said notches, and said spring blade is fastened to the film sensitivity setting member to serve as the coupling means between said two setting members for film sensitivity and flash indexes.

References Cited

UNITED STATES PATENTS

| 2,917,984 | 12/1959 | Faulhaber | 95—64 |
| 3,085,485 | 4/1963 | Stieringer | 95—10 |
| 3,094,052 | 6/1963 | Singer | 95—10 |
| 3,273,483 | 9/1966 | Weidner, et al. | 95—10 XR |
| 3,358,571 | 12/1967 | Lange | 95—64 XR |

NORTON ANSHER, *Primary Examiner.*

JOSEPH F. PETERS, JR., *Assistant Examiner.*